(12) United States Patent
Houtz

(10) Patent No.: US 7,052,388 B2
(45) Date of Patent: May 30, 2006

(54) MEAT CUTTING SYSTEM

(75) Inventor: Ronn A. Houtz, Wichita, KS (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 10/922,819

(22) Filed: Aug. 20, 2004

(65) Prior Publication Data
US 2005/0085176 A1    Apr. 21, 2005

Related U.S. Application Data

(60) Provisional application No. 60/496,469, filed on Aug. 20, 2003.

(51) Int. Cl.
*A22C 25/14* (2006.01)
(52) U.S. Cl. .................................... 452/157
(58) Field of Classification Search ............... None
See application file for complete search history.

(56) References Cited

U.S. PATENT DOCUMENTS

| | | | |
|---|---|---|---|
| 3,722,032 A | 3/1973 | Draper et al. | |
| 4,793,025 A | 12/1988 | Melville et al. | |
| 4,862,557 A | 9/1989 | Clayton | |
| 4,962,568 A | 10/1990 | Rudy et al. | |
| 5,162,016 A * | 11/1992 | Malloy | 452/149 |
| 5,334,084 A * | 8/1994 | O'Brien et al. | 452/157 |
| 5,476,417 A * | 12/1995 | Long et al. | 452/127 |
| 5,542,878 A | 8/1996 | Sheedy et al. | |
| 5,551,910 A | 9/1996 | Nielsen et al. | |
| 5,591,076 A * | 1/1997 | Evers et al. | 452/157 |
| 5,902,177 A * | 5/1999 | Tessier et al. | 452/156 |
| RE36,664 E | 4/2000 | O'Brien et al. | |
| 6,104,966 A * | 8/2000 | Haagensen | 700/116 |
| 6,129,625 A * | 10/2000 | Cate et al. | 452/127 |
| 6,248,012 B1 | 6/2001 | Folkmann | |
| 6,267,661 B1 * | 7/2001 | Melville | 452/157 |
| 6,277,020 B1 * | 8/2001 | Stephens | 452/135 |
| 6,443,828 B1 * | 9/2002 | Melville | 452/157 |
| 6,547,658 B1 * | 4/2003 | Boody et al. | 452/171 |
| 6,563,904 B1 * | 5/2003 | Wijts et al. | 378/58 |

FOREIGN PATENT DOCUMENTS

| | | |
|---|---|---|
| EP | 0 459 558 A1 | 12/1991 |
| EP | 1 023 840 A1 | 8/2000 |

OTHER PUBLICATIONS

W. K. Heiland et al., "Robotic High Pressure Water Jet Cutting of Chuck Slices[1]", Journal of Food Process Engineering, vol. 12, No. 1, (Aug. 1998).

* cited by examiner

Primary Examiner—Thomas Price
(74) Attorney, Agent, or Firm—Dorsey & Whitney, LLP

(57) ABSTRACT

An automated meat cutting system and method is disclosed. The automated meat cutting method comprises securing a carcass portion in a position, imaging the carcass portion to determine cutting paths and cutting the carcass portion along the thus determined cutting paths.

13 Claims, 8 Drawing Sheets

MEAT CUTTING SYSTEM

CROSS REFERENCE TO RELATED APPLICATIONS

This application claims priority to U.S. Provisional Application No. 60/496,469, filed on Aug. 20, 2003, the contents of which is incorporated herein by reference in its entirety.

BACKGROUND OF THE INVENTION

1. Field of the Invention

The present invention relates to cutting devices. More specifically, the present invention relates to a system and method for cutting meat from bone.

2. Description of the Related Art

The processing of an animal to produce resultant meat products suitable for consumption is relatively complex, time consuming and requires a fair degree of knowledge and skill. Even large scale processing plants rely on human operators to handle and process individual carcasses.

Many aides have been provided to assist these operators and to make them more efficient. For example, power assisted cutting tools may be utilized. Further, some processes, such as cleansing or pasteurization may be automated.

However, for the most part human operators possess a degree of skill, knowledge and an ability to evaluate each carcass separately that cannot be readily replicated by automated machinery. As such, the production line is typically limited by the speed at which its human operators can safely process the carcass.

One process is the saw operations of wing break and chine (spine or backbone) boning jobs. Typically, the wing break and chine boning is accomplished using a band saw.

Another process is the removal of finger meat from a rib plate. That is, removal of the meat disposed between and around the rib bones of a carcass. Generally, this process is done by hand by a person wielding a butcher knife. The process of separating the finger meat is difficult because the bones are obscured, the spacing between and around the ribs is small, and the orientation of the rib plate does not lend itself to an ergonomic cutting and trimming environment.

Thus, there exists a need in the art to provide for an automated system and method for cutting meat.

SUMMARY OF THE INVENTION

An automated meat cutting system and method is disclosed. The automated meat cutting method comprises securing a carcass portion in a position, imaging the carcass portion to determine cutting paths and cutting the carcass portion along the thus determined cutting paths.

A process for cutting a carcass portion comprising positioning a carcass portion on a work surface, securing the carcass portion to the work surface using holding fixtures, visualizing the carcass portion using an imaging device, computing a path for cutting the carcass portion, and cutting the carcass portion along the paths.

An automated wing and rib chine saw machine system for cutting a carcass portion comprising a work surface for supporting a carcass portion, at least one fastener coupled to the work surface for securing the carcass portion to the work surface, a vision system for visualizing the carcass portion and determining at least one cutting path, a cutter, and a positioning manipulator for controlling the cutter and moving the cutter along the at least one cutting path.

A process for separating finger meats from a rib plate comprising providing a rib plate in a determinable location, visualizing the rib plate to determine a cutting path for separating the meats from the rib plate, mapping the location of the ribs within the rib plate based upon the visualizing of the rib plate, and cutting the rib plate with a cutter to separate the finger meats, based upon the mapped location of the ribs.

A system for automatically cutting finger meats from a rib plate comprising a clamp for securing a rib plate, an imaging source for visualizing the rib plate, a controller for processing the image of the rib plate to map the location of ribs within the rib plate and to determine a cutting path, and a cutting tool for cutting the finger meats from the rib plate by following the cutting path provided by the controller.

While multiple embodiments are disclosed, still other embodiments of the invention will become apparent to those skilled in the art from the following detailed description, which shows and describes illustrative embodiments of the invention. As will be realized, the invention is capable of modifications in various obvious aspects, all without departing from the spirit and scope of the invention. Accordingly, the drawings and detailed description are to be regarded as illustrative in nature and not restrictive.

DETAILED DESCRIPTION

To process an animal, such as a cow, for meat production, the animal is stunned and then bled. The carcass is hung and the hide is removed. The carcass may be subjected to various other processes and may remain whole or split in half. The carcass is further separated to produce the desired cuts of meat and meat products.

A method for automated meat cutting comprises securing a carcass portion in a position, imaging the carcass portion to determine cutting paths and cutting the carcass portion along the thus determined cutting paths. The meat cutting system is further suitable for cutting portions of poultry or fish.

During wing break and chine boning, a portion of the carcass is separated into the following: (1) brisket, (2) primal rib, (3) short plate or ribs, and (4) navel (white) bone. A system is provided to perform the cutting operations to thus separate the portion of carcass.

Figure 1:
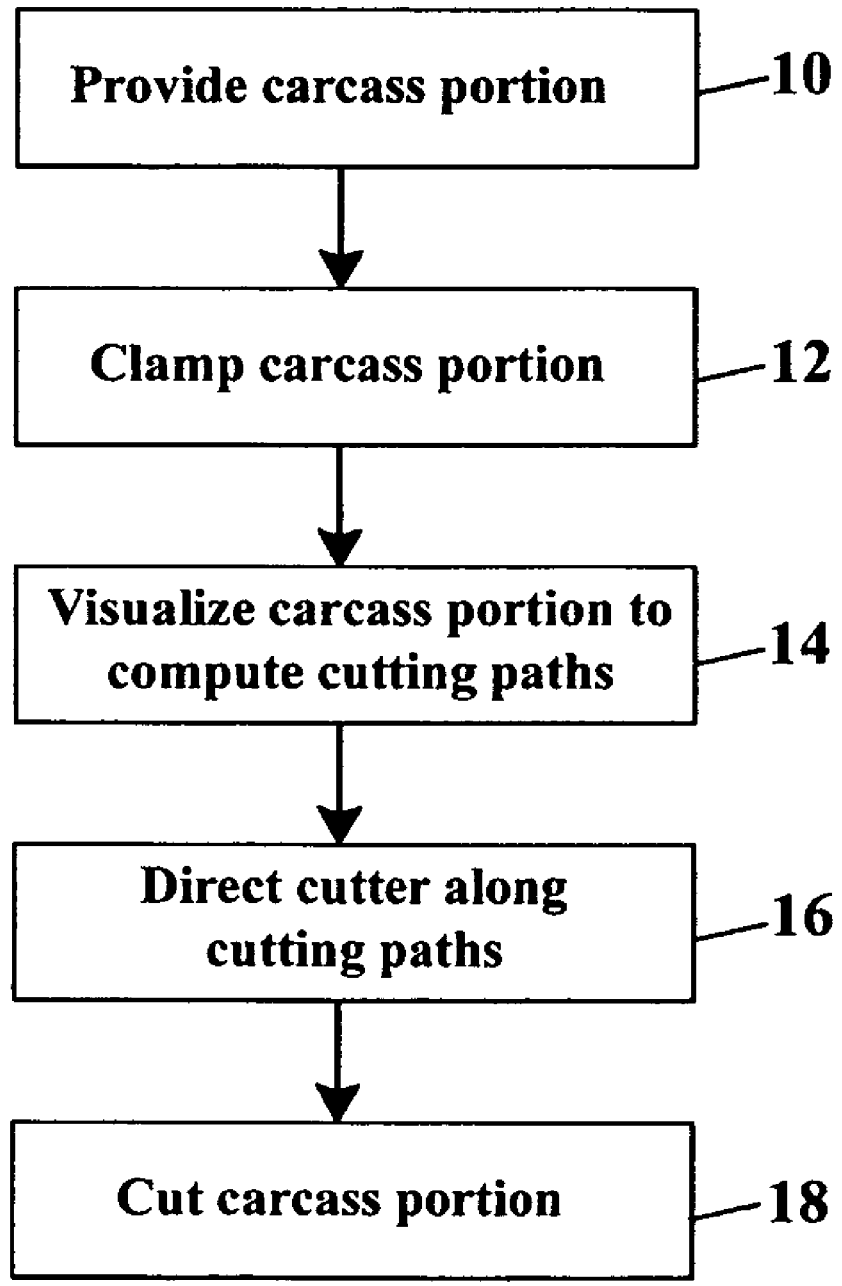
FIG. 1 illustrates a flowchart of a process for automated meat cutting in accordance with one embodiment of the present invention.

A process for performing cutting operations on a portion of carcass is schematically illustrated in FIG. 1 according to an exemplary embodiment. The process beings with providing a carcass portion having a hip bone, a rib plate, a navel and a brisket bone, shown at block 10. The carcass portion is secured, for example, clamped, shown at block 12, to stabilize the carcass portion in position. As shown at block 14, the carcass portion is then imaged or visualized to acquire and compute cutting paths. After the cutting paths have been computed, a positioning manipulator may be used to position and move a cutter, shown at block 16. The cutter cuts through the carcass portion, shown at block 18. After cutting operations are completed, the carcass portion is released and the cuts of meat are deposited into a storage unit such as a holding bin.

Figure 2:
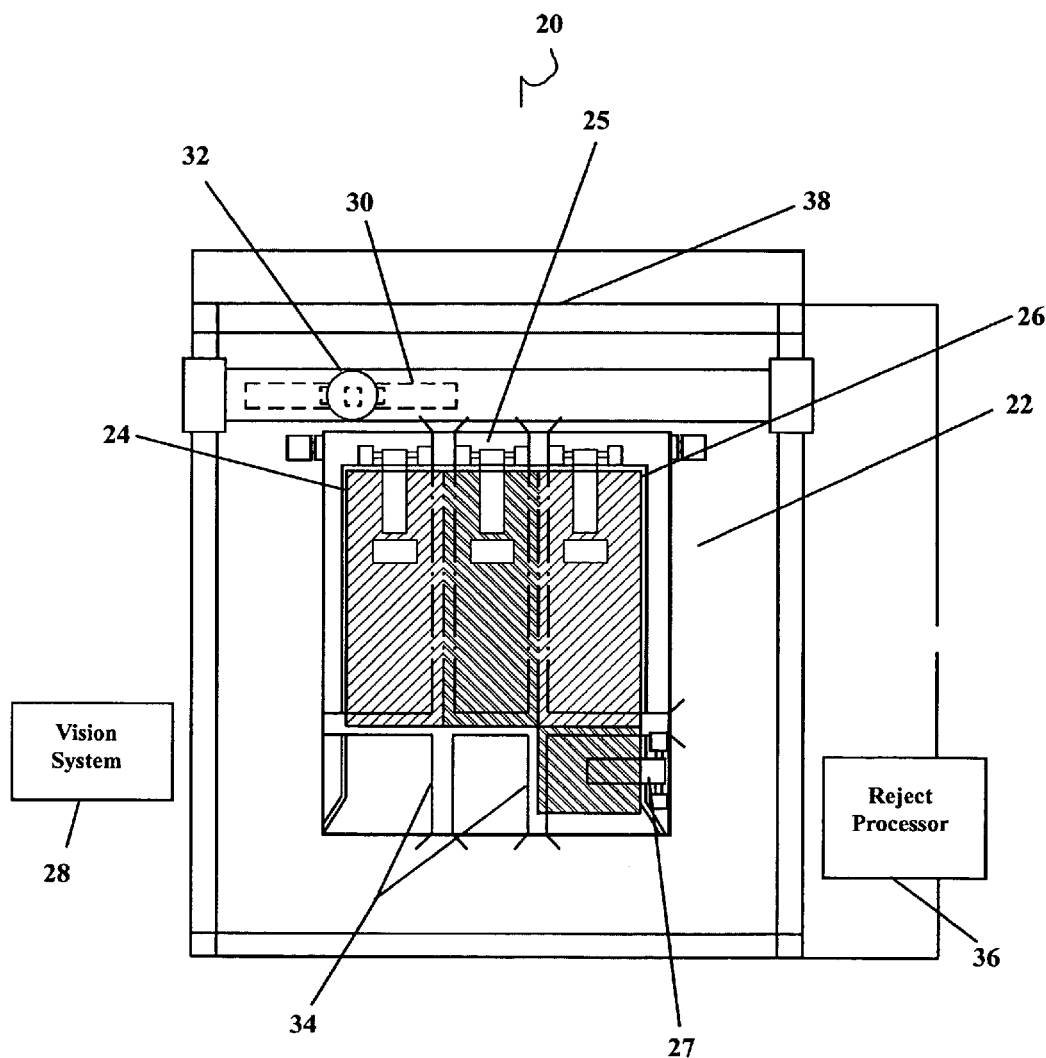
FIG. 2 illustrates a system for automated meat cutting in accordance with one embodiment of the present invention.

FIG. 2 illustrates an automated wing and rib chine saw machine system 20 according to an exemplary embodiment. A typical carcass portion for cutting by system 20 is a wing, the width being approximately 34", the length being approximately 40", the height being approximately 9"and the weight being approximately 49 pounds. Of course, the carcass portion may vary considerably from these example guidelines and these are intended to be illustrative only.

As shown, the automated wing and rib chine saw machine system 20 includes a work surface or table 22 with fasteners, shown as holding clamps 24–27 attached thereto, an overhead mounted vision system 28, and a cutter 30 mounted on a positioning manipulator 32.

The table 22 retains or maintains position of the carcass portion during cutting and may be configured as a rotary table to rotate or pivot downwardly to deposit cuts of meat into a holding bin after cutting. The table may be configured to move up for cutting and down for release of the product. According to an alternate embodiment, the table may be configured as a stationary table.

The carcass portion is placed on the table 22. Placement may be done manually or automatically. The carcass portion generally includes the hip bone, the rib plate, the navel and the brisket bone. The carcass portion is generally positioned such that the hip bone is clamped with a one holding clamp 24, the rib plate is clamped with another holding clamp 25, the navel is clamped with yet another holding clamp 26, and the brisket bone is clamped with a further holding clamp 27. Of course, more or fewer holding clamps may be provided. The clamping action may be manual or automated. In one embodiment, the holding clamps 24–27 are pneumatic devices used to perform the function of securing the carcass portion to the table 22 and release the cut carcass portion from the table 22 after cutting.

An overhead mounted vision system 28 comprising overhead mounted vision cameras images the carcass portion, acquires path data and computes cutting paths based on the imaged carcass portions. Lighting may be provided to increase the contrast between fat, bone and muscle. For example, a blend of green and white lighting may be used. Generally, the lighting source is designed to be resistant to water and blood splattering. For example, LED lights may be used.

The vision system 28 produces a fast, accurate and discernable image that can be digitized and processed. One manner of producing such images is through frame grabber technology. The camera "grabs" a single frame or still shot and analysis is done of that single frame. Another manner of producing such images is via analog input using a continuous camera. Using such imaging, it is possible to have continuous input during cutting of the carcass such that the cut path may be adjusted if necessary. Generally, the vision system 28 may produce black and white images. The images are used to show the contrast of the fat, bone, and muscle and produce shapes from that contrast. As a result, color may not be relevant. However, a color image may be produced in an alternate embodiment.

In one embodiment, the vision system is a two dimensional (x-axis and y-axis) vision system used to acquire and compute cutting paths based upon pre-determined criteria. A single or a plurality, for example 2–3, cameras may be used. Of course, other vision systems, for example ultrasound, x-ray, infra-red or other suitable means may alternately be used for acquiring path data.

The vision system produces an image from which shapes may be identified, for example from visible bone location. The image is digitally processed and various physically discernable features (such as color or density contrast) are utilized to determine bone boundaries. These boundaries are mapped to coordinates and a cutting path is plotted. A computer program may be provided having specific algorithms for identifying shapes or structures and plotting a cutting path. Specific algorithms may be developed for different carcass portions such that imaging and plotting a cutting path may be performed for any phase of carcass rendering.

Once the path is determined, a positioning manipulator 32 positions and moves a cutter 30 along the path. Cutting tracks 34 are provided along which the cutter 30 may be moved. The cutter 30 is mounted to the positioning manipulator 32. The cutter 30 may be a commercially available band saw. In alternative embodiments, a cutter other than a band saw, such as a water jet or a knife, may be used.

In one embodiment, the positioning manipulator 32 is a three axis manipulator, manipulating along the x-axis, the y-axis, and in rotation. The positioning manipulator may be configured to have a working envelope of approximately 70 inches by approximately 76 inches. The positioning manipulator 32 may be controlled by an intelligent, fast motion control unit (IFMCU). The positioning manipulator 32 may be configured to conform to a closed loop control scheme such that ever action is verified before a cycle can continue.

Alternately, a positioning manipulator other than a three-axis manipulator may be used.

Generally, three cuts are performed, one between the hip bone and the rib plate, one between the rib plate and the navel, and one between the navel and the brisket bone. Using these cuts, the carcass portion may be separated into a brisket, a primal rib, a short plate (ribs), and a navel (white) bone.

After cutting, the cut meat is discharged into a holding bin. Discharge may be achieved by way of tilting the table 22 if configured as a rotary table.

If path data cannot be generated by the vision system 28, the carcass portion may be automatically removed from the automated wing and rib chine saw machine system. A reject processor 36 may be included to remove non-readable, or otherwise unsuitable, carcass portions from the table 22.

The automated wing and rib chine saw machine system 20 may be configured to cut approximately six carcass portions per minute.

In the embodiment shown in FIG. 2, the automated wing and rib chine saw machine system 20 is supported by a frame 38. The frame 38 may be a powder-coated frame that is steel welded from square tubing and plate steel with round smooth surfaces.

In one embodiment, system controls may be self-contained within panels. Generally, these panels are configured to be resistant to the regular care taken during meat processing. For example, the panels may be configured to be resistant to a high pressure hose. The panels may be located within the volume of the system frame base and be accessible behind tool-removable safety panels. Operator interface screens may be via an man-machine-interface (MMI) unit that is physically located on an arm attached to the system frame. Sensor information may be included in programming to trip alarm conditions and aid in debugging the automated wing and rib chine saw machine system.

One or more emergency stop buttons may be included to create a cut-off circuit for the automated wing and rib chine saw machine system. Pressing such a button immediately stops all or part of the automated wing and rib chine saw machine system. In one embodiment, all products are manually removed from the automated wing and rib chine saw machine system before startup or after an emergency stop.

ANSI and OSHA specifications require a perimeter guarding system around any moving mechanism. In order to satisfy such specifications, a perimeter guarding system may be installed around the automated wing and rib chine saw machine system and be included in the frame. The frame may be constructed from welding steel framing with clear and/or opaque panels. Access doors may be provided to allow opening of the perimeter guarding system for debugging or adjustments. The access doors may be provided with switches or sensors that are part of an emergency stop circuit. Thus, the automated wing and rib chine saw machine system may be configured with a fail-safe emergency stop system causing all motion to case and stop the process if an access door is opened, if an emergency stop button is depressed, or if an internal fault is detected.

In one embodiment, the automated wing and rib chine saw machine system 20 as shown in FIG. 2 is approximately 6 feet long by 6 feet long by 4 feet tall.

Thus, as described above, a sequence of operations is as follows, according to an exemplary embodiment. A carcass portion is loaded into the automated wing and rib chine saw machine system. Holding fixtures are engaged to secure the carcass portion to a table. Machine vision acquires and computes path data for cutting the carcass portion. A cutter is routed through pre-determined paths and cuts the carcass portion. The holding fixtures are disengaged, the table tilts and deposits cut portions into a holding bin.

Figure 3:
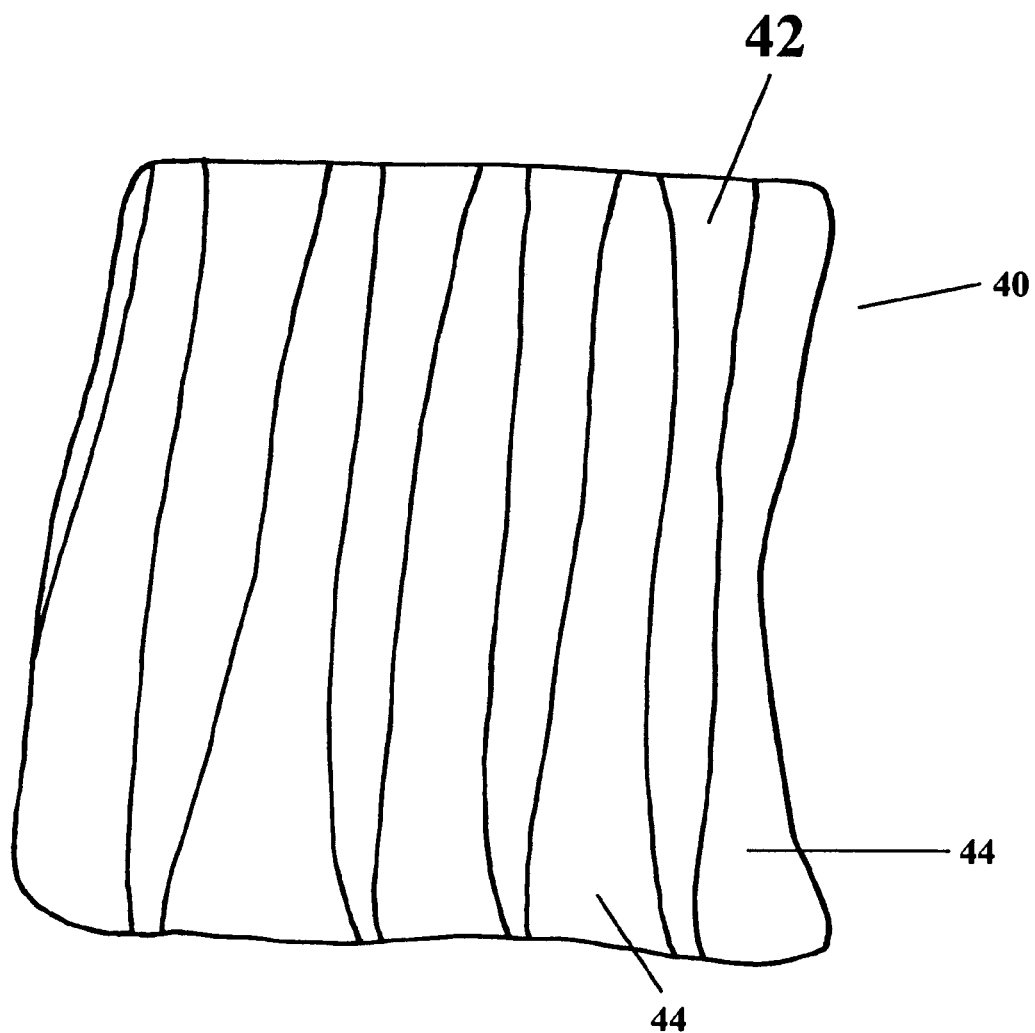
FIG. 3 illustrates a top planar view of an X-ray image of a rib plate.

After separation of the rib plate, a section of the rib cage, from the remainder of the carcass, using the process described in relation to FIGS. 1 and 2 or using another suitable process, meat is removed from the rib plate. The rib plate 40 is illustrated in FIG. 3. The rib plate 40 includes a number of rib sections 42 with portions of meat 44, referred to herein as "finger meat," spaced therebetween. As will be explained in greater detail, various imaging techniques (such as X-ray) may be utilized and FIG. 3 represents an image of the rib plate 40 that allows the ribs 42 to be visibly discerned from the finger meat 44. Without such an imaging technique, the ribs 42 may be partially or fully obscured from view by the surrounding meat.

Traditionally, to obtain the finger meat 44, a knife is manipulated by hand to follow along the ribs 42. Good useable meat may be wasted by being inappropriately cut, accidentally discarded, or by remaining attached to the rib bones. The cutter may also cut into the bone or cartilage, which may add undesirable elements to the meat and also serves to slow the process by dulling or damaging the cutting tools. After cutting, the meat is separated from the bone in this manner and the meat is then processed or packaged.

Figure 4:
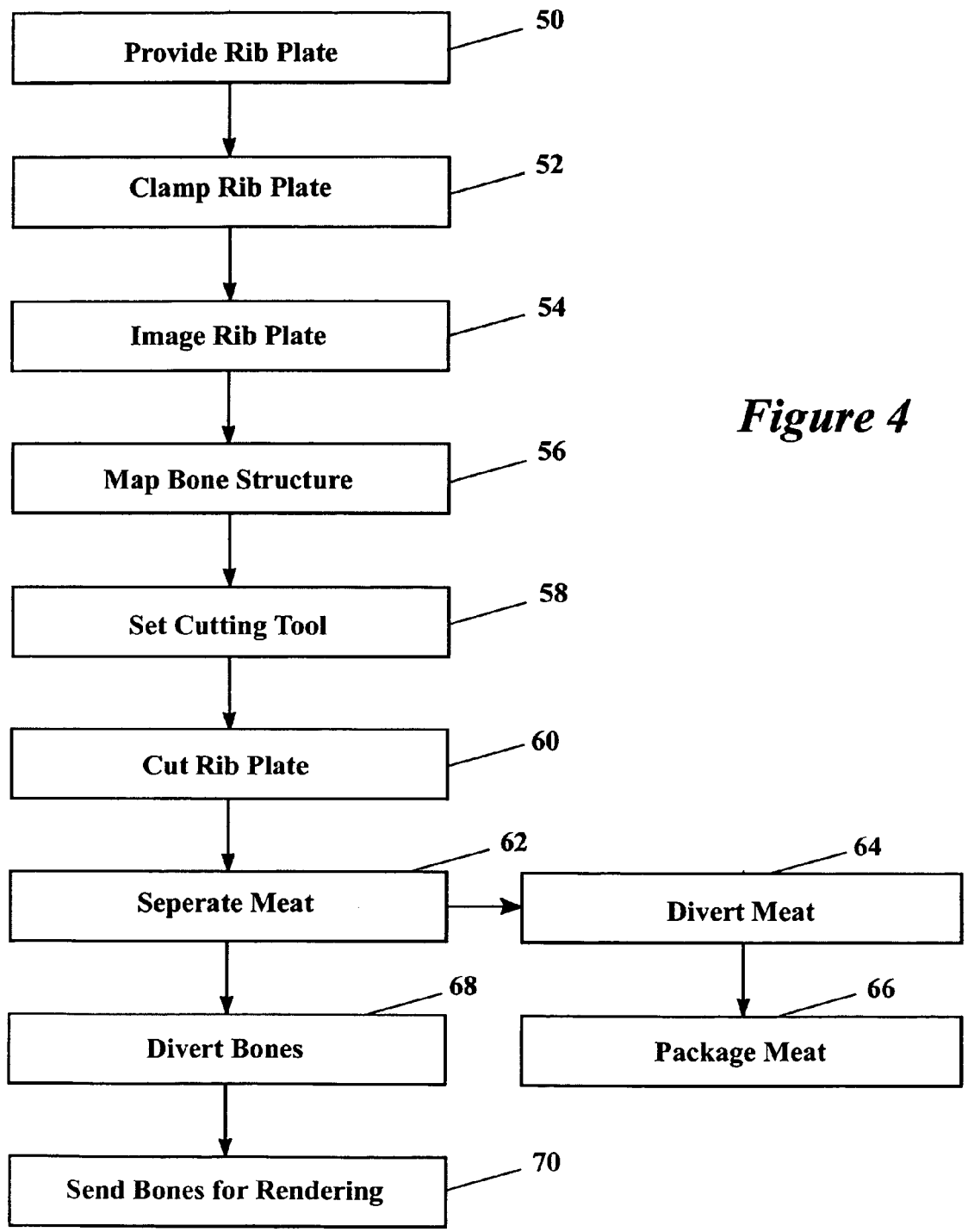
FIG. 4 illustrates a flowchart of a process of separating finger meats in accordance with one embodiment of the present invention.

FIG. 4 is a flowchart illustrating the process of producing finger meats 44 from a rib plate 40 according to an exemplary embodiment. Initially, a rib plate is provided, shown at block 50. The rib plate is a section of the rib cage having one or more sections of rib bone surrounded by finger meat. Typically, the rib plate includes 7–9 ribs. The rib plate is clamped, shown at block 52, or otherwise secured into a definable position. This can be done by an automated or machine-driven process, or each rib plate can be so positioned by hand. The rib plate is clamped so that its position can be controlled and determined by a controller and ultimately so that a cutting tool cuts the rib plate 40 in the proper locations.

The secured rib plate is then imaged, shown at block 54. Imaging the rib plate 40, for example by x-ray, produces a fast, accurate and discernable image that can be digitized and processed. The location and boundaries (e.g., edges of bones) of the ribs can thus be readily and precisely identified. As an alternative to x-raying, visible light, IR, or other imaging techniques can be used to image the rib plate.

Once the rib plate is imaged, the resulting data is digitized or otherwise processed to allow for automated mapping of the location of the ribs, shown at block 56. The image is digitally processed and various physically discernable features (such as color or density contrast) are utilized to determine bone boundaries. These boundaries are mapped to coordinates and a cutting path is plotted. Data relating to the cutting path is passed to the cutting tool, shown at block 58.

The rib plate is positioned relative to the cutting tool and the cutting tool cuts through the meat based on the mapped cutting path, shown at block 60. One type of cutting tool that may be used as the cutting tool is a water jet. The water jet easily cuts through the meat without damaging or soaking the meat, but does not substantially cut bone or cartilage. Thus, unwanted byproducts are not necessarily introduced into the meat. Generally, a water jet only. requires control in two dimensions. The waste produced is minimal. In one embodiment, waste water is produced at a rate of about 1.5 liters/minute with a cutting pressure of 50,000 psi.

Once all of the cuts have been made, the meat is mechanically separated from the bone, shown at block 62. The meat may then diverted, shown at block 64, and packaged, shown at block 66. Similarly, the separated bones may be diverted, shown at block 68, and sent for rendering, shown at block 70.

Generally, rib plates are processed as a standard plate of 7 to 8 ribs or a short plate of approximately 4 ribs. A standard plate generally runs from the $6^{th}$ rib to the $12^{th}$ or $13^{th}$ rib while a short plate generally runs from the $9^{th}$ or $10^{th}$ rib to the $12^{th}$ or $13^{th}$ rib. The automated finger meat cutting system may be used for processing standard plates or short plates. To accommodate varied sizes of rib plates, the system may be configured rib plate dimensions as follows. Rib plate weight of approximately 2.2 kgs (5.3 lbs). Rib plate width ranging from 178 mm (7") to 281 mm (15"). Rib plate length ranging from a minimum standard length of 228 mm (9") and minimum short length of 127 mm (5") to a maximum length of 610 mm (24"). Bone thickness ranging from 6 mm (¼") to 25 mm (1"). Maximum rib curvature (measured to highest point if plate is on flat surface) of 76 mm (3"). The automated finger meat cutting system may be configured for alternate rib plate dimensions. However, the above-listed dimensions are considered examples illustrative of typical rib plates.

While FIGS. 5 through 8 are described in reference to automated finger meat cutting of a rib plate, it is to be appreciated that the system may be used for automated cutting of any meat, poultry, or fish portion.

Figure 5:
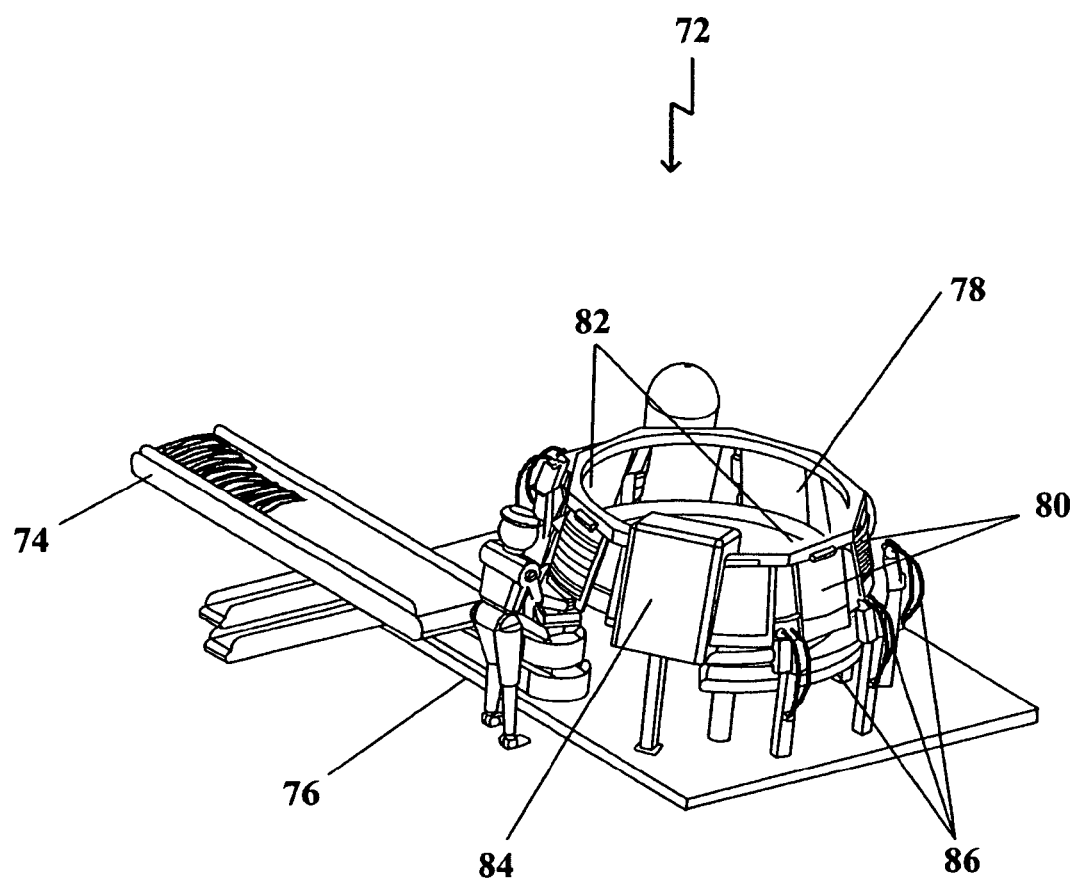
FIG. 5 illustrates a system for automated cutting of finger meat from a rib plate in accordance with one embodiment of the present invention.

FIG. 5 illustrates a first embodiment of an automated finger meat cutting system 72. As shown, the automated finger meat cutting system 72 includes a product supplier 74, a loading station 76, a transfer system 78 with rib plate stations 80, clamp modules 82 located around the transfer system 78 at each of the rib plate stations 80, a visualization module 84, and a plurality of cutting systems 86. In one embodiment, seven rib plate stations 80 are provided such that seven rib plates may be positioned no the transfer system 78. For a rib plate having 7 ribs, 14 cuts are done, one cut above the bone and one cut below the bone. Thus, fourteen cutting stations 86 may be provided.

In the embodiment shown, the product supplier 74 is a product supply conveyer belt, the visualization module 84 is an x-ray module and the cutting systems 86 are water jet cutting systems. Other product suppliers, visualization modules or cutting systems may be used.

Clamp modules 82, or other fasteners, are provided for securing the rib plates to the rib plate stations 80. In one embodiment, the clamp modules each comprise a pivoting jaw with a 3 point contact on top rib plate bone. The clamp modules are configured such that the plate is held securely with generally little or no movement relative to the transfer system 78 and provide back support to assure steady rib plate orientation throughout the process. The clamp modules may be configured such that the are spring loaded and normally shut and thus easy and safe for manual loading by an operator.

In an exemplary embodiment, the visualization module 84 is configured to detect the edges of the bones. In the embodiment shown, the visualization module 84 is an x-ray module and detects the edges of the bones using an x-ray sensing system. Alternately the visualization module may utilize visible light, infra-red (IR), or any other means for discerning bone from meat. Generally, the visualization module functions to both image the rib plate and process the data. The visualization distinguishes between meat, bone and cartilage. Further, the visualization system detects the leading and trailing edge of each rib to provide start and end points for the cutting system. The locations of the various ribs are identified by determining contrasting portions of the image. The output of the visualization module 84 is positional information for the cutting system. The data output generally consists of a minimum of 17 points along each rib. A minimum of approximately 17 points along each rib ensure that the cutting path does not intersect bone. Points indicate bone/meat interface or cartilage/meat interface. In one embodiment, the maximum tolerance for each point is 0.4 mm. The positional information is communicated to the cutting system. Data positional points are synchronized with the cutting system and the information is synchronized with a particular position on the transfer system 78. The location of the ribs are plotted and the rib plate is moved to a cutting station.

As shown in FIG. 5, the rib plate passes through the visualization module 84 roughly horizontally after being loaded on a rib plate station 80 by an operator. Entry and exit apertures to the visualization module 84 are designed to be sufficiently large to accommodate the largest rib plates oriented in any way. Thus, the entry and exit apertures may be approximately 610 mm (24") high by 150 mm (6") wide. Rib plates have meat on only one side (generally termed the outside). The system may be configured to permit the rib plates to be loaded on a rib plate station 80 either meat side in or meat side out. Further, the system may be configured to accommodate both left and right hand rib plates, based on the left or right side of the carcass. In one embodiment, the rib plate is hung at the rib station with the $12^{th}$ or $13^{th}$ rib on the bottom—thus, with a standard plate the rib plate is hung from the $6^{th}$ rib and with a short plate the rib plate is hung from the $9^{th}$ or $10^{th}$ rib. In one embodiment, the maximum processing time excluding imaging is 4 seconds.

In the embodiment shown in FIG. 5, each cutting system 86 is a water jet nozzle sequenced along the transfer system. Thus, each cut path is an independently actuated water jet nozzle. In one embodiment, basic cutting is performed by filtered water at 40,000 psi through a 0.007 inch orifice. Obviously, other suitable pressures and orifice sizes may be used. Generally, the water is not recirculated after cutting and is directed to a drain.

In an alternative embodiment, a band saw may be used as the cutter. Generally, band saws for meat are relatively large and cut vertically. A band saw for use with the fingermeat cutting system may be designed as a floating band saw with horizontal cutting. Such band saw is relatively small, approximately one foot long, with a wheel of approximately 8 inch diameter. Further, a high speed may be used with the band saw for improved meat cutting.

In one embodiment, after a cut has been performed with a cutting system 86, a portion of the rib plate falls from the rib plate and may be collected. Thus, one cutting system may cut above a piece of meat and the piece of meat is collected. The next cutting system may cut above a piece of bone and the bone is collected. The next cutting system may cut above a piece of meat and the meat is collected. This continues until the ribs and meat have been separated.

Example design parameters for the system described in relation to FIG. 5 are listed in Table 1. These parameters are intended to be illustrative of suitable parameters only and are not intended to be limiting.

TABLE 1

| Design Parameters | Metric units | US units |
| --- | --- | --- |
| Set Machine Speed | 250 mm/sec | 49.21 ft/min |
| Maximum Time to Load | 2 sec | |
| Movement of clamp | 500 mm during loading | 19.69 in |
| Minimum width of loading | 882 mm | 34.72 in |
| Max Width of plate | 382 mm | 15.04 in |
| Rotational Speed | 1.91 rpm | |
| Throughput with 1 plate | 1.91 pieces/min | |
| Throughput with 1 plate | 114.58 pieces/hr | |
| Required Throughput | 800 pieces/hr | |
| Require Loads per Rev | 7 plates | |
| Plate Spacing (must be greater than plate width) | 1122.14 mm, center to center plates | |
| Circumference of cut | 7855 mm | |
| Minimum width of plate | 180 mm | 7.09 in |
| Clamp width | 180 mm | 7.09 in |

Figure 6:
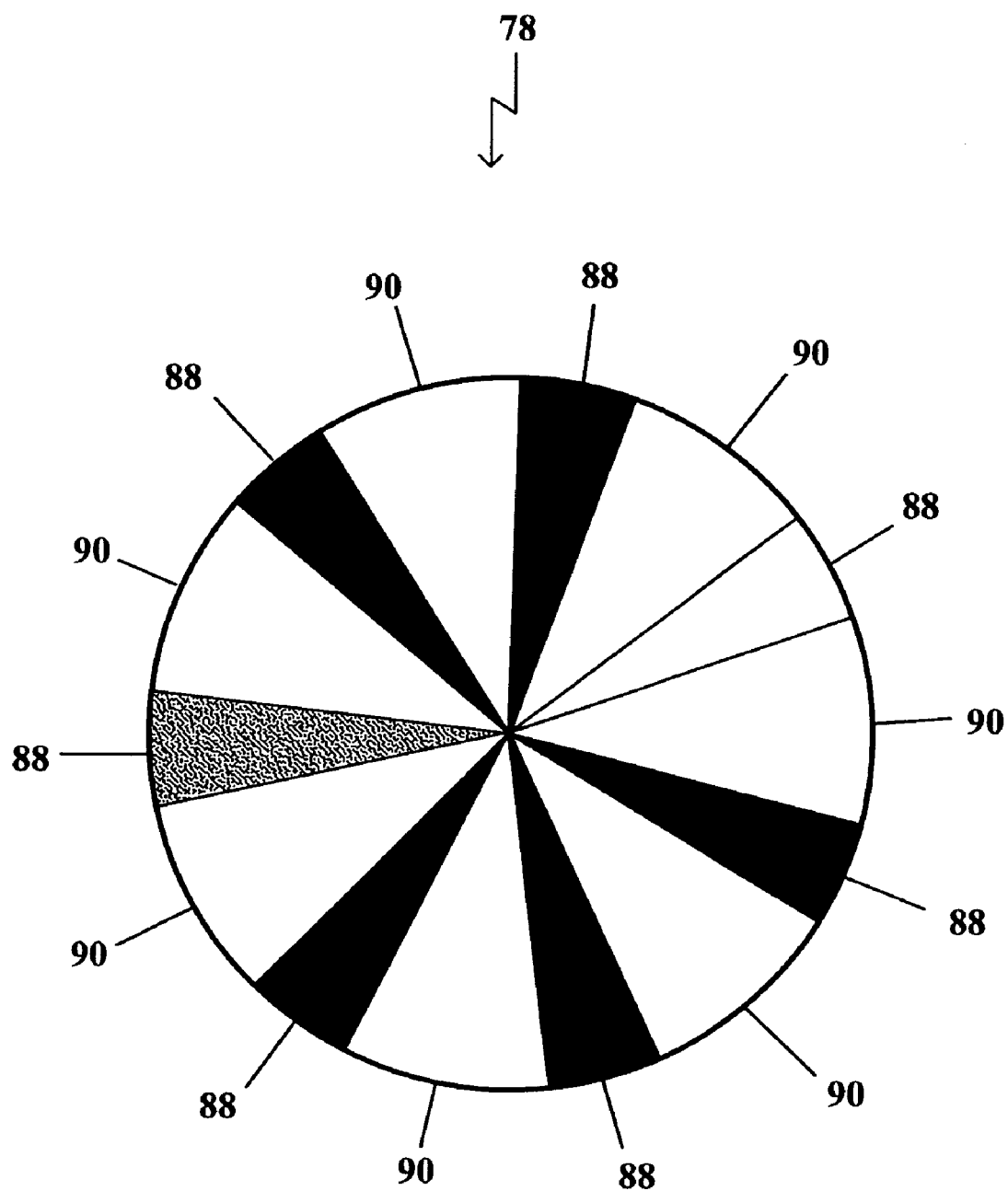
FIG. 6 illustrates a top schematic view of a transfer system of a system for automated cutting of finger meat from a rib plate in accordance with one embodiment of the present invention.

FIG. 6 illustrates a top schematic view of a transfer system 78 of a finger meat cutting system as described in relation to FIG. 5. The transfer system 78 comprises a plate turntable, FIG. 6 illustrating a top view of the turntable. The plate turntable includes seven plates 88 and seven spaces 90. Each of the plates 88 comprise a rib plate station 80. Thus, the turntable of the transfer system 78 comprises a series of plates comprising rib plate stations 80 separated by a series of spaces 80. The exact number of plates and spaces is not critical. In an embodiment where the transfer system 78 is a turntable, the transfer system provides a continuous process wherein rib plates are continuously loaded and cut. The speed of the process is largely dependant upon the cut speed of the cutters and the load speed of an operator or automated loader.

Figure 7:
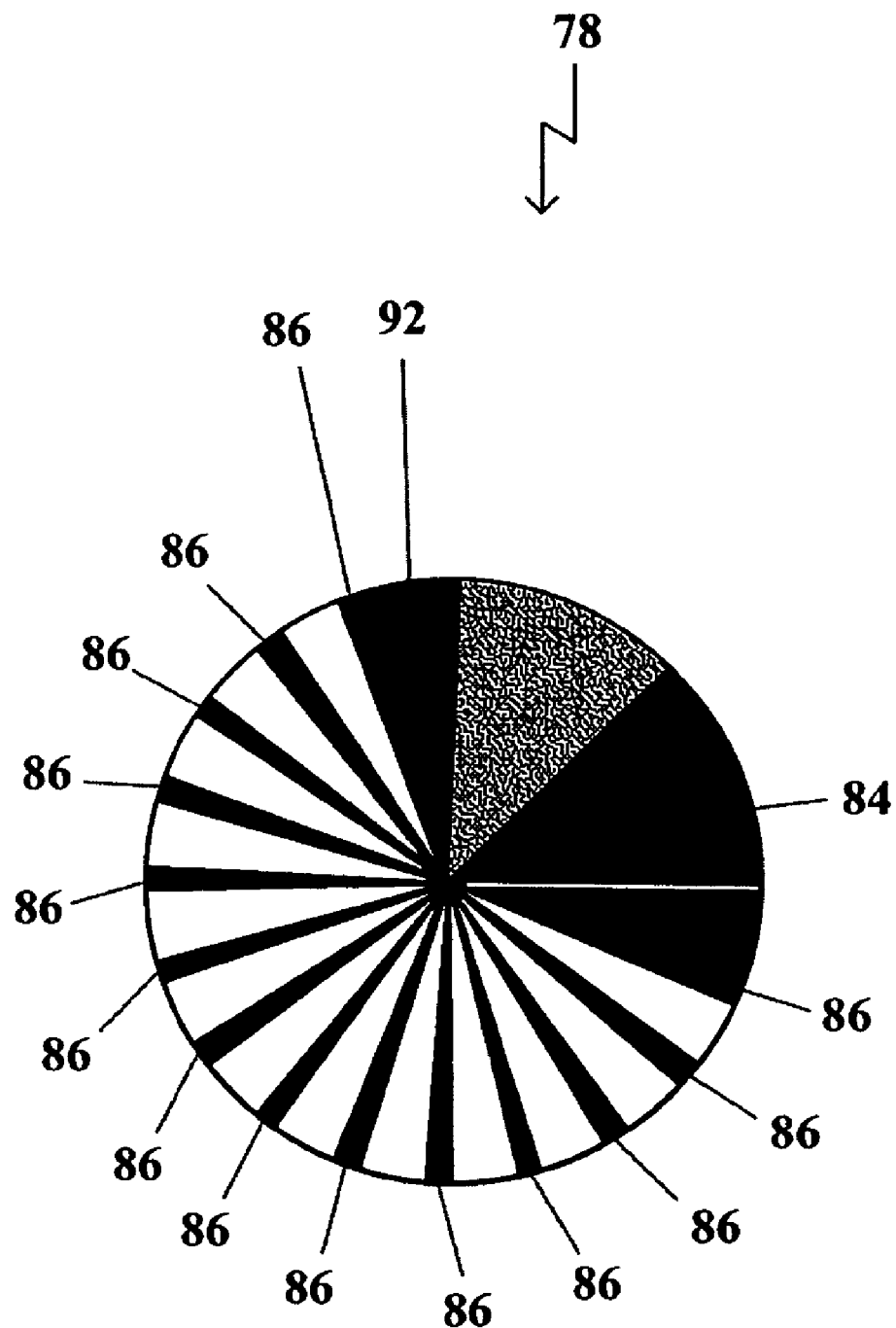
FIG. 7 illustrates a schematic view of the timing of the system of FIG. 5.

FIG. 7 illustrates a schematic view of the timing of the system described in relation to FIG. 5 for cutting finger meat from a rib plate. Thus, FIG. 7 diagrammatically illustrates the amount of time allotted to each step of the process performed on the turntable of the transfer system 78. Rib plates are loaded at a rib plate station 80 along the transfer system 78. After loading, the rib plate is moved by the transfer system 78 to the imaging station or visualization module 84. At the imaging station 84, the rib plate is visualized and cutting paths are determined. During processing time along the transfer system 78, the cutting paths are communicated to each cutting station. As shown, the system includes 14 cutting stations 86, each cutting station 86 performing a different cut along the rib plate. The rib plate is sequentially transferred through each cutting station 86 by the transfer system 78. Simultaneously, further rib plates may be loaded at the loading station 76 and visualized at the imaging station 84. After completion of the cutting paths, the rib plate is removed from the transfer system 78 at an unloading station 92.

Figure 8:
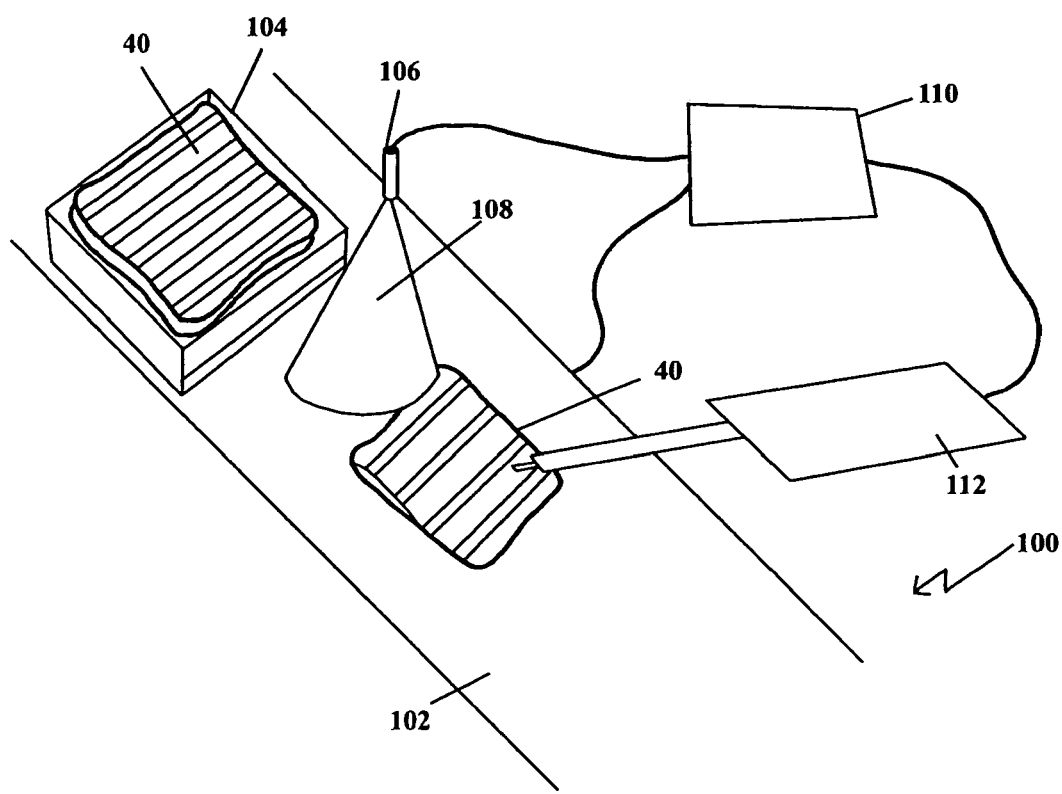
FIG. 8 illustrates a schematic view of an imaging source and water jet for processing a rib plate in accordance with one embodiment of the present invention.

FIG. 8 schematically illustrates a second embodiment of an automated finger meat cutter 100. One or more rib plates 40 are placed into a hopper 104, from which they are supplied to a conveyor belt 102. Though not separately shown, the rib plates 40 are secured to hold them in a predetermined orientation and to keep them fixed relative to the conveyor belt 102. Alternatively, each rib plate 40 may be manually placed onto the conveyor and separately clamped to hold them in place. In either case, the clamped rib plate 40 is held to prevent shifting or a change in orientation.

An imaging device 106 illuminates or irradiates the rib plate 40. The imaging device may utilize X-rays, visible light, infra-red (IR), or any other means for discerning bone from meat. A resulting scan or image of the rib plate 40 is produced (e.g., FIG. 1), digitized and sent to a controller 100. The controller 110 processes the scan or image and maps the particular rib plate 40. The locations of the various ribs 44 are automatically identified by determining contrasting portions of the image. The location of the ribs 44 are plotted and the rib plate 40 is moved to a cutting station 112.

The cutting station 112 is an automated cutting tool that can be controlled and manipulated in two or three dimensions. In one embodiment, the cutting station 112 is a water jet. Alternatively, wire cutting, a spinning disc, or a milling cutter could be used. The cutting station 112 moves to cut the meat based on the coordinates provided by the controller 110. Thus, the meat is precisely separated from the bone with minimal waste. Furthermore, when a water jet is used, the water jet will not cut the bones and thus no bone fragments will be cut and processed with the meat. The water jet can further be set so as to not cut cartilage.

Thus, the controller 110 receives information for each rib plate 40, maps the locations for cutting, controls or programs the cutting tool 112, and either controls the motion of the conveyor 102 or receives positional information therefrom so that the location of the rib plate 40 is known.

Once the meat has been separated, the meat is sent to a packaging station or otherwise processed. The bones are sent for rendering or otherwise utilized.

Although the present invention has been described with reference to preferred embodiments, persons skilled in the art will recognize that changes may be made in form and detail without departing from the spirit and scope of the invention.

I claim:

1. A process for separating meats from a rib plate, comprising:
    providing a rib plate in a determinable location;
    visualizing the rib plate to determine a cutting path for separating the meats from the rib plate;
    mapping the location of ribs within the rib plate based upon the visualizing of the rib plate; and
    cutting the rib plate with a cutter to separate the finger meats, based upon the mapped location of the ribs.

2. The process of claim 1, wherein the cutter is an automated cutter.

3. The process of claim 1, wherein the cutter is a band saw.

4. The process of claim 1, wherein the automated cutter is a water jet.

5. The process of claim 1, wherein the imaging comprises X-raying the rib plate.

6. The process of claim 1, wherein mapping the location of ribs within the rib plate includes identifying a space to cut.

7. A process for cutting a carcass portion comprising:
    positioning a carcass portion on a work surface;
    securing the carcass portion to the work surface using holding fixtures, the holding fixtures being positioned so as not to interfere with visualizing the carcass portion;
    visualizing the carcass portion using an imaging device;
    computing a path for cutting the carcass portion; and
    cutting the carcass portion along the path.

8. The process of claim 7, further including disengaging the holding fixtures.

9. The process of claim 7, further including depositing the cut carcass portion into a holding bin.

10. The process of claim 9, wherein the depositing comprises tilting the table.

11. The process of claim 9, wherein the routing is performed using a positioning manipulator.

12. The process of claim 9, wherein the cutting is performed using a band saw.

13. The process of claim 9, the cutting portion is cut into at least one of a brisket, a primal rib, a short plate, and a navel bone.

* * * * *